US011809931B2

(12) United States Patent
Shen et al.

(10) Patent No.: US 11,809,931 B2
(45) Date of Patent: Nov. 7, 2023

(54) QR CODE EXTENSION METHOD

(71) Applicant: UNI2K Information Technology Co., Ltd., Tongxiang (CN)

(72) Inventors: Yi Shen, Tongxiang (CN); Shaolei Liu, Tongxiang (CN); Nianqing Luo, Tongxiang (CN); Zhehai Zhu, Tongxiang (CN)

(73) Assignee: UNI2K Information Technology CO., Ltd., Tongxiang (CN)

( * ) Notice: Subject to any disclaimer, the term of this patent is extended or adjusted under 35 U.S.C. 154(b) by 207 days.

(21) Appl. No.: 17/422,927

(22) PCT Filed: Feb. 20, 2020

(86) PCT No.: PCT/CN2020/075964
§ 371 (c)(1),
(2) Date: Jul. 14, 2021

(87) PCT Pub. No.: WO2020/173368
PCT Pub. Date: Sep. 3, 2020

(65) Prior Publication Data
US 2022/0092374 A1 Mar. 24, 2022

(30) Foreign Application Priority Data
Feb. 28, 2019 (CN) .......................... 201910150852.1

(51) Int. Cl.
*G06K 19/06* (2006.01)
(52) U.S. Cl.
CPC . *G06K 19/06056* (2013.01); *G06K 19/06037* (2013.01); *G06K 19/06075* (2013.01)

(58) Field of Classification Search
CPC .................. G06K 19/06037; G06K 19/06
USPC ........................................... 235/494
See application file for complete search history.

(56) References Cited

U.S. PATENT DOCUMENTS

| 8,459,565 B2 | 6/2013 | Wang et al. |
| 2011/0049244 A1* | 3/2011 | Wang ............... G06K 19/06056 358/1.9 |

FOREIGN PATENT DOCUMENTS

| CN | 103473582 A | 12/2013 |
| CN | 103530669 A | 1/2014 |
| CN | 104917637 A | 9/2015 |
| CN | 105989389 A | 10/2016 |
| CN | 109919279 A | 6/2019 |
| JP | 2011048638 A | 3/2011 |
| JP | 5321352 B2 | 10/2013 |

* cited by examiner

*Primary Examiner* — Paultep Savusdiphol
(74) *Attorney, Agent, or Firm* — IPro, PLLC

(57) ABSTRACT

Disclosed is a QR code extension method, comprising the following steps: S1. obtaining data encoding information, and determining the number of positioning points based on a data encoding length; S2. partitioning a data area according to different shapes, and adjusting a parameter of each data partition by adjusting the number of transverse and/or longitudinal unit QR codes; and S3, drawing a QR code, and outputting a result. The method is more flexible, and can make a QR code realize one-way or two-way extension, and the length and the width of a data area can be slightly adjusted to ensure that the capacity of the data area is close to the size of data information, so that capacity in per unit space is optimized.

9 Claims, 5 Drawing Sheets

QR CODE EXTENSION METHOD

TECHNICAL FIELD

The present invention relates to the field of computer application, relates to QR code technology, and particularly relates to QR code extension method.

BACKGROUND

With the development of society, QR code identification and payment technologies have been developed rapidly, and have become an important way in human life. QR code is a new generation of barcode technology to record data symbol information with a certain set graph and black and white rectangular matrices distributed on a plane in the two-dimensional direction according to a certain law, and is generally composed of QR code arrays and QR code numbers, as well as descriptive words below. The QR code has the characteristics of large information content, strong error-correcting capability, high identification speed and omnidirectional reading, and has wide application fields. Meanwhile, secure identification of the QR code has become an important research direction.

In the prior art, the QR code capacity should not be adjusted according to the data, that is, the QR code capacity allocation is unadjustable. Waste of resources is serious, the efficiency is low, and the accuracy is not high. Chinese patent application with the patent publication number CN104917637A discloses a method and system for file sharing. Specifically, a file is split into continuous page files and the continuous page files are numbered to generate QR code including the contents and numbers of the continuous page files and display the QR code on a sharing device. A receiving device reads and decodes the QR code to obtain the content and the number of a single page file. The sharing device switches to display the QR code of the content and the number of a next page, and returns to execute the step of "generating QR code including the contents and numbers of the continuous page files and displaying the QR code on the sharing device" until the last page of the continuous page files is read. The file can be transmitted without network or mobile media through the above mode. However, the technical solution has the following disadvantages: 1. An intuitive disadvantage is: the technology generates a plurality of QR codes. It is difficult to avoid confusion between QR code group and the QR code of another file during transmission or use. 2. The more the used QR codes are, the worse the waste on capacity is. It is known that generally the QR code cannot just save the data content and will have a margin. Therefore, when the number of the QR codes is large, the space is extremely wasteful. 3. Number information is added into each QR code. Although the method can sequence the data, the method needs to occupy the data storage space in the QR code.

In addition, in the prior art, the most widely used QR code is also used and through the data capacity, the version is directly selected to obtain capacity extension. However, in this way, although the direct selection of the version is faster, many limitations are caused. The extension must be a square, at least in shape. Moreover, due to the limitations of the version, no further treatment is made on the capacity during extension. Therefore, this method is not the optimal solution of the capacity. In other words, in the generation of the QR code, the storage is not adjusted according to the size of the data capacity.

SUMMARY

The purpose of the present invention is to overcome the defects of the prior art and provide QR code extension method. The method is more flexible, and is QR code extension mode which can optimize the storage capacity of a unit space.

The present invention provides QR code extension method, comprising the following steps:

S1. obtaining data code information, and determining the number of positioning points based on the length of a data code;

S2. partitioning data areas according to different shapes, and adjusting the parameters of each data area by adjusting the number of transverse and/or longitudinal unit QR codes;

S3. drawing QR code and outputting a result.

Preferably, the number of the positioning points is determined based on the standard of a default data area.

Preferably, the number of the positioning points is determined by calculating the capacity of the data areas.

Preferably, determination of the number of the positioning points is determination of the number of appropriate transverse and longitudinal positioning points.

Preferably, the positioning points comprise main positioning points and auxiliary positioning points.

Preferably, the number of the positioning points is determined by direct selection from a list of custom versions according to the code length.

Preferably, the extension method further comprises compiling the number information of the positioning points into a basic information area.

Preferably, the data capacity of the QR code is larger than the length of the data code.

Preferably, in the step S2, the data areas are specifically partitioned according to different shapes into A data area, B data area and C data area.

Preferably, the capacity of the A data area, the B data area and the C data area satisfies the relationship: $x*y+y:2x+(y-1)*(x-1):x*y$, wherein, x and y respectively represent the number of the transverse unit QR codes and the number of the longitudinal unit QR codes of the final QR code.

Preferably, the step S2 of determining the capacity of each area by adjusting the number of the transverse and/or longitudinal unit QR codes specifically comprises adjusting x and y parameters.

Preferably, the width L1 of the A data area and the length L2 of the B data area are adjustable parameters; the number of the A, B and C data areas, the length of the A area and the width of the B region are fixed values; the parameters of the C area are obtained according to A and B parameters; and a total capacity needed by the data areas in the QR code is calculated by adjusting L1 and L2.

Preferably, the needed total capacity is infinitely close to a real encoded data size, but not less than the encoded data size.

Preferably, the step S3 specifically comprises drawing QR code framework according to the number of the positioning points, the transverse and longitudinal parameters of the positioning points and the length and width parameters of the data areas, and filling in the encoded data.

Preferably, before the result is outputted, all the parameter information is processed into codes and filled into the basic information area.

The QR code extension method of the present invention can achieve: to make the extension of the QR code more flexible, the extension mode can achieve unidirectional or bidirectional extension of the QR code. To optimize the capacity, the parameters of the data areas are subjected to variable processing. Namely, the length and the width of the data areas can be finely adjusted. This can ensure that the capacity of the data areas is close to the size of the data information to optimize the capacity in the unit space.

Reference Signs: 103—spacer area; 106—camouflage spacer area; 201—A data area unit partition; 202—B data area unit partition; 203—C data area unit partition; 100—positioning point; 101—basic information area; 102—outer frame; 103—spacer area; 104—auxiliary positioning point.

DETAILED DESCRIPTION

Specific implementation of the present invention is described below in detail. It is necessary to indicate here that the following implementation is only used for further illustrating the present invention, and shall not be understood as a limitation to the protection scope of the present invention. Non-essential improvements and adjustments made by those skilled in the art according to the above contents of the present invention shall also belong to the protection scope of the present invention.

Figure 1:
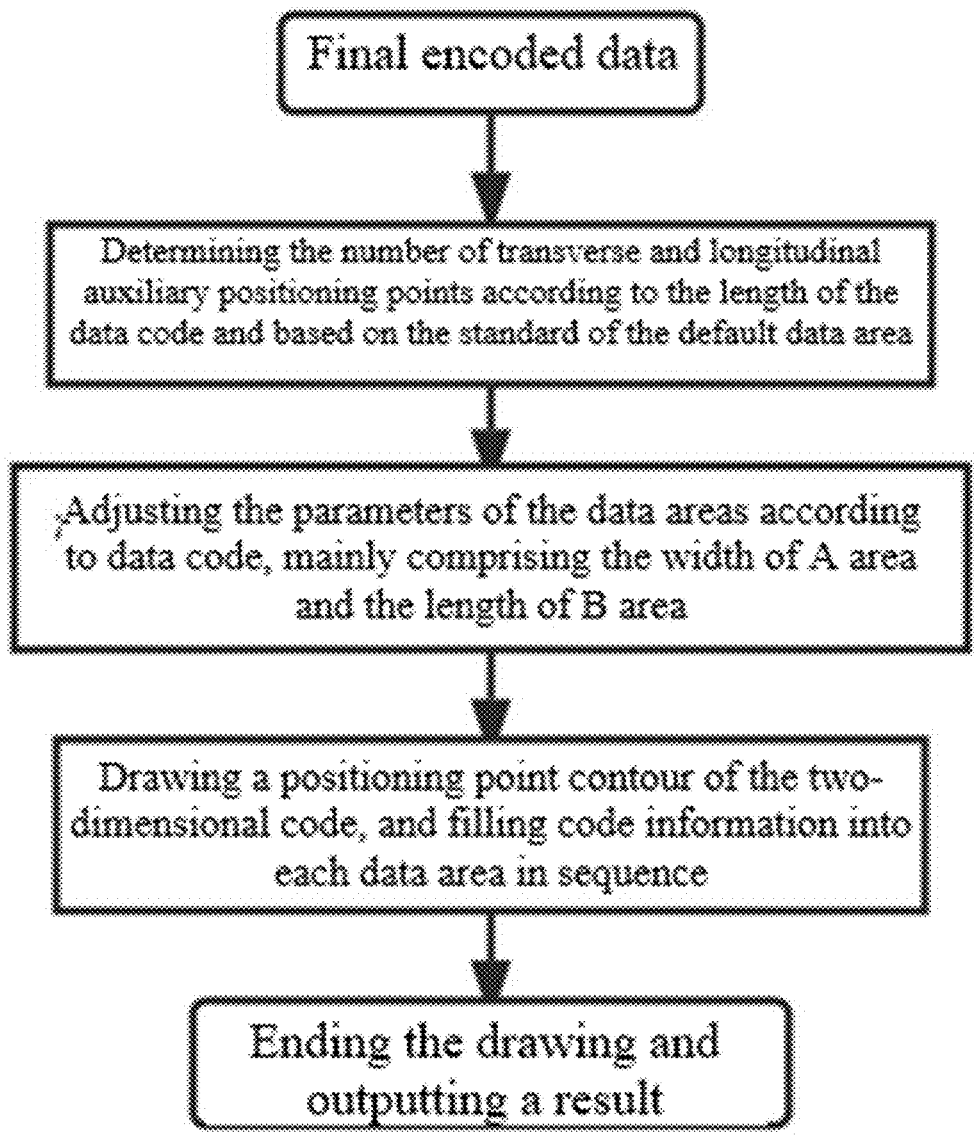
FIG. 1 is a flow chart of QR code extension method.

The present invention provides QR code extension method, and a specific process of the method is shown in FIG. 1.

In the extension mode of the present invention, on one hand, the QR code can be more flexible through the unidirectional or bidirectional extension form; and on the other hand, unnecessary data filling can be reduced through parameter adjustment of the data areas to maximize the data capacity of the unit area.

The realization steps of the present invention specifically comprise the following steps:

1. Obtaining final data code information.
2. Obtaining the code length according to the code information, and selecting the number of appropriate transverse and longitudinal positioning points.

Figure 4:
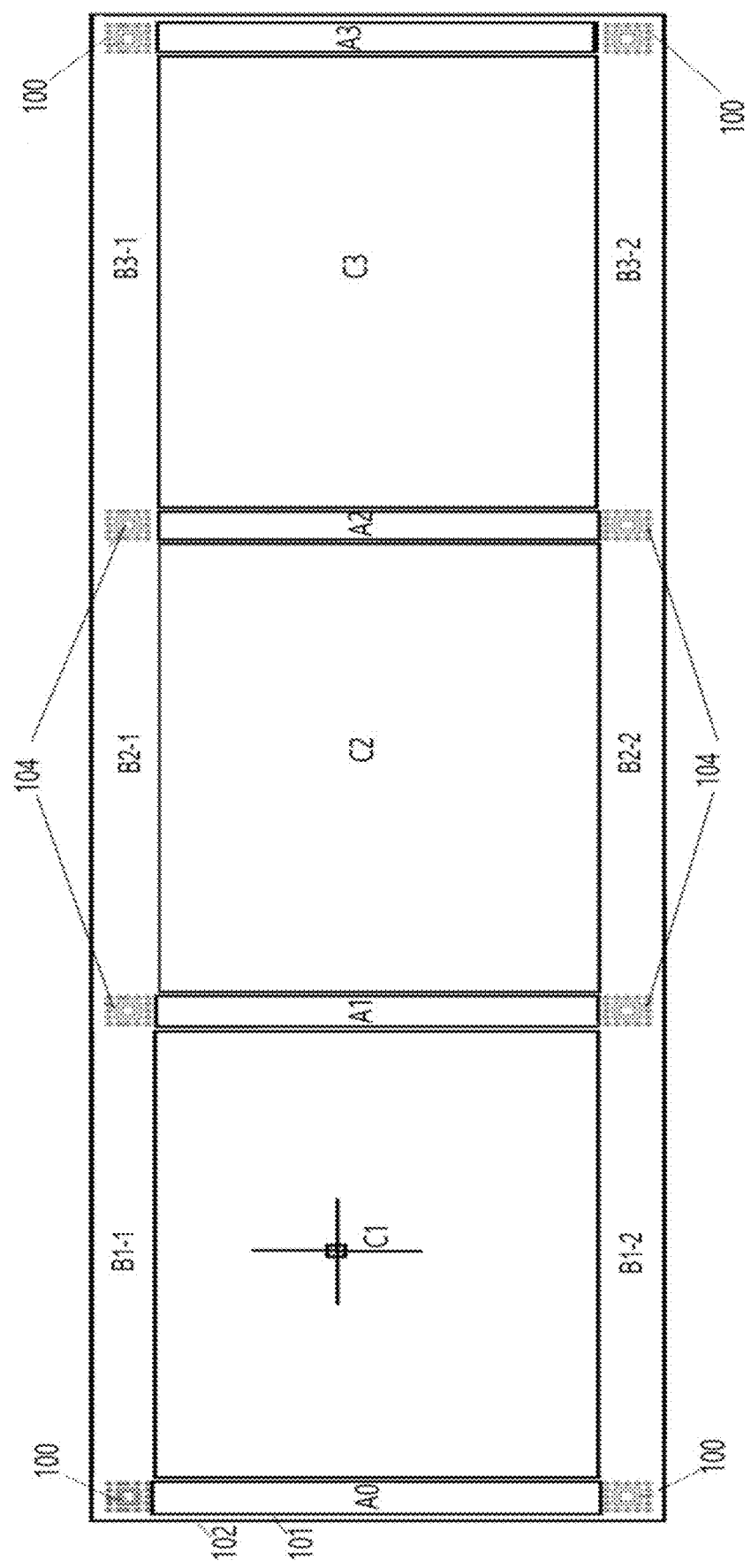
FIG. 4 is a structural diagram of QR code with three transverse units and one longitudinal unit.
Figure 5:
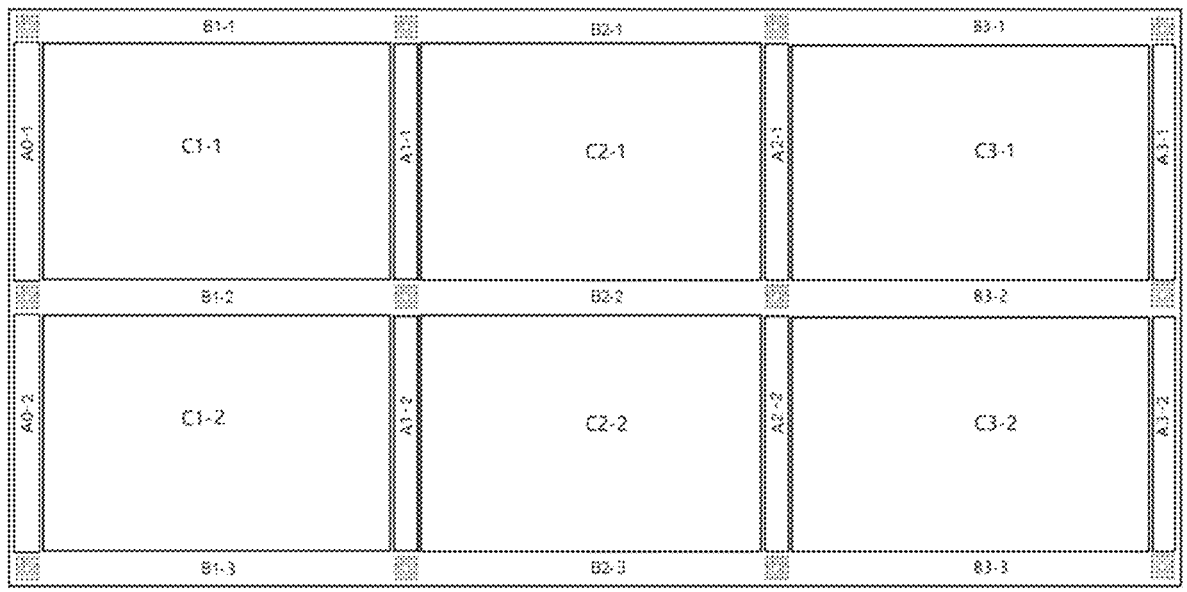
FIG. 5 is a structural diagram of QR code with three transverse units and two longitudinal units.

The above positioning points comprise main positioning points and auxiliary positioning points. Of course, the positioning points can be distributed around the QR code, as shown in FIG. 5, and can also be added in the middle of the QR code. In addition, the positioning points also determine the number of the data areas. The data areas are partitioned according to different shapes into A area, B area and C area in the present invention. As shown in FIG. 4, specific data areas are located below numbers A, B and C in the figure. The data areas below the same number have the same parameters.

The number of the positioning points can be obtained through fixed calculation formulas. Because the parameters of the initial data area are default standards and the proportions of the data areas are regular, the number of the positioning points can be determined by calculating the capacity of the data areas. The number of the positioning points can also be directly selected from a list of custom versions according to the code length. However, in any form, the number information of the positioning points will be compiled into the basic information area (FIG. 2-101), and the data capacity of the QR code must be larger than the length of the data code.

Figure 3:
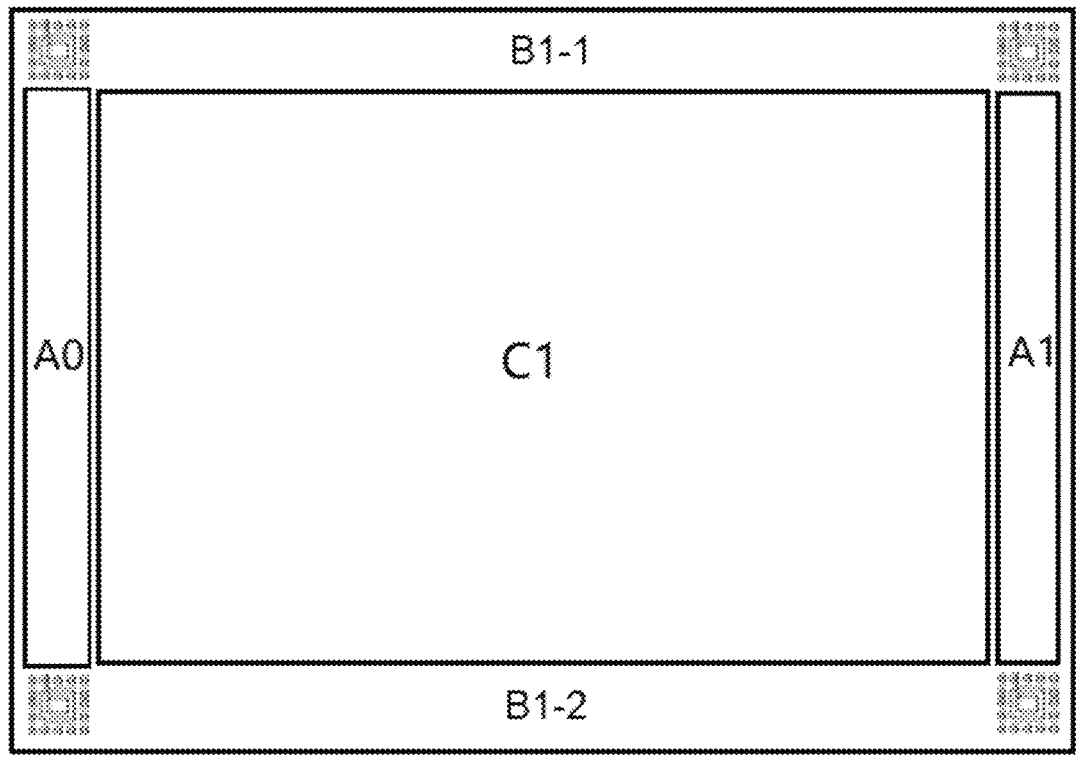
FIG. 3 is a structure of a unit QR code.

The proportional rule of the above data areas is: if x and y respectively represent the number of transverse unit QR codes and the number of longitudinal unit QR codes in the final QR code (the unit is the QR code as shown in FIG. 3),then A:B:C must satisfy $x*y+y: 2x+(y-1)*(x-1):x*y$, i.e., $A:B:C=x*y+y:2x+(y-1)*(x-1):x*y$.

Unidirectional or bidirectional pattern extension can be realized for the setting of x and y parameters. x is unchanged and y is changed, or y is unchanged and x is changed, i.e., only the change of the parameter in one of the directions represents unidirectional extension. The change of both x and y, i.e., the change of the parameters in the two directions, represents bidirectional extension.

For comparison of acquisition of the number of two types of positioning points, the calculation of the first mode is relatively time-consuming, but the result will be more conducive to next data space optimization. The second mode is rapider, and has speed advantage in encoding and decoding, and relatively beautiful patterns.

3. Obtaining the number of transverse and longitudinal positioning points according to the code length and the previous step.

The step is an important invention point step of the present invention. In the step, when the width L1 of the A area and the length L2 of the B data area are adjustable parameters and the number of the A, B and C data areas, the length of the A area and the width of the B region are fixed values, the parameters of the C area can be obtained according to A and B parameters. If L1 and L2 can be adjusted, the total capacity needed by the data areas in the QR code can be calculated.

A calculation principle is: the capacity of the data areas is infinitely close to a real encoded data size, but not less than the encoded data size. The design can realize the optimization of the data capacity, that is, all the resources in the space will be allocated to the real encoded data to reduce the complement information of blank parts.

4. Drawing QR code and outputting a result.

Figure 2:
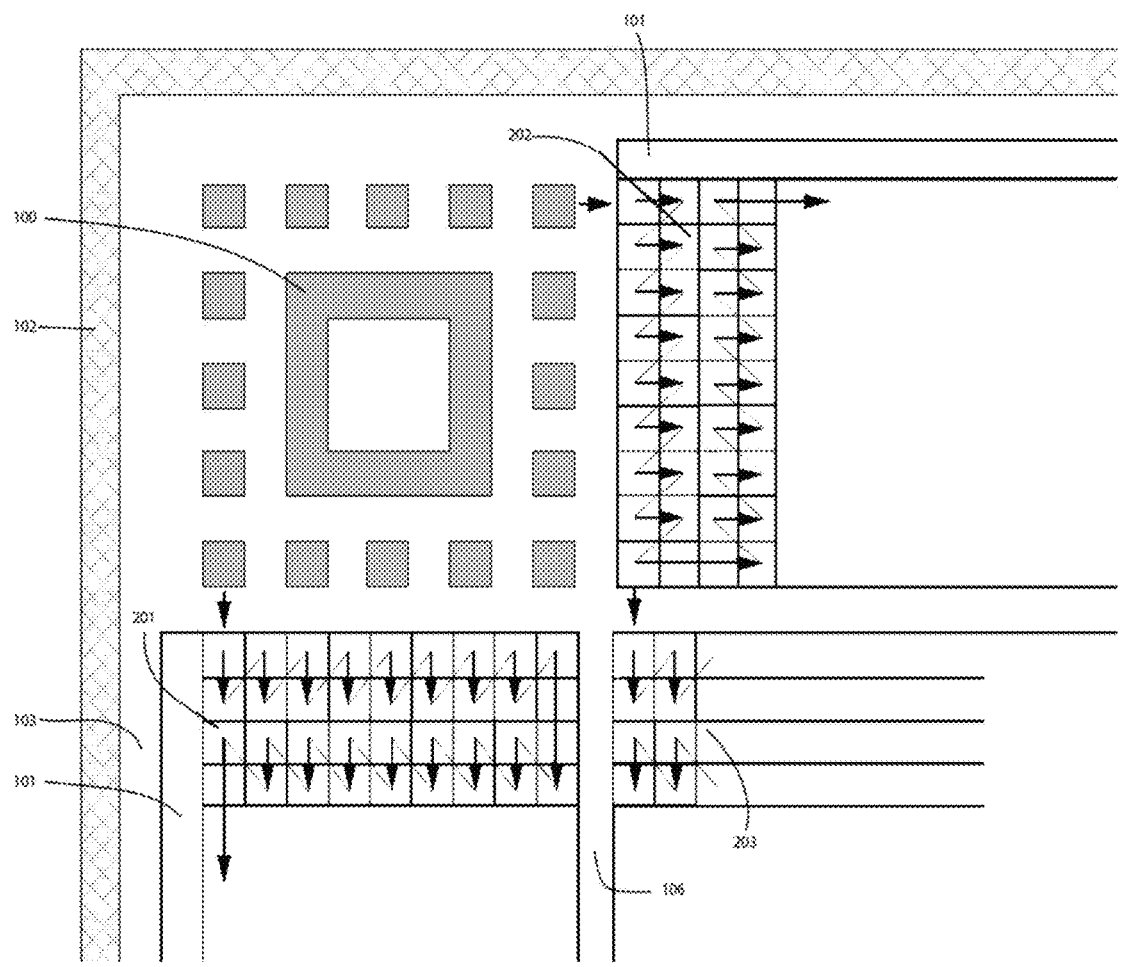
FIG. 2 is a specific structural schematic diagram of QR code.

QR code framework is drawn according to the number of the positioning points, the transverse and longitudinal parameters of the positioning points and the length and width parameters of the data areas. The encoded data are filled in. Before the result is outputted, all the parameter information needs to be processed into codes and filled into the basic information area (FIG. 2-101). The QR code is outputted.

Unidirectional or bidirectional extension of the QR code can be realized for the parameters in transverse and longitudinal dimensions in the present invention, so that the extension of the QR code is more flexible and changeable.

The variable parameters of the data areas of the present invention can reduce unnecessary data capacity, make the capacity of the data areas more close to the sum of the capacity of the data areas, and achieve the result of optimal data capacity in the unit space.

Although exemplary embodiments of the present invention have been described for the purpose of explanation, it will be appreciated for those skilled in the art that various variations of amendments, additions and replacements can be made in the forms and details without departing from the invention scope and spirit disclosed in appended claims, and all these variations shall belong to the protection scope of the appended claims of the present invention. Moreover, the steps in all parts and methods of the product to be protected by the present invention can be combined in any combination form. Therefore, the explanation of the embodiments disclosed in the present invention is not intended to limit the scope of the present invention, and merely used to explain the present invention. Accordingly, the scope of the present invention is not limited by the above embodiments, and is defined by the claims or equivalents thereof.

What is claimed is:

1. A method, comprising:
   obtaining a data code, and determining the number of positioning points based on the length of the data code;
   partitioning data areas, and adjusting parameters of each of the data areas by adjusting the numbers of transverse unit QR codes and/or longitudinal unit QR codes;
   drawing a QR code;
   wherein at least one of the data areas is partitioned into an A data area, a B data area and a C data area;
   wherein the capacities of the A data area, the B data area and the C data area meet a relationship of $x*y+y:2x+(y-1)*(x-1):x*y$, x and y respectively representing the number of the transverse unit QR codes and the number of the longitudinal unit QR codes;
   wherein the number of the transverse unit QR codes and/or the number of the longitudinal unit QR codes are adjusted to determine the capacity of each of the data areas; and
   wherein, the width L1 of the A data area and the length L2 of the B data area are adjustable;
   wherein the numbers of the A data area, the B data area and the C data area, the length of the A data area and the width of the B data area are fixed values;
   wherein the parameters of the C data area are obtained according to the parameters of the A data area and the B data area, and the total capacity of the data areas is calculated based on L1 and L2.

2. The method according to claim 1, wherein, the number of the positioning points is determined by calculating the capacity of the data areas, or determined by direct selection from a list of custom versions.

3. The method according to claim 2, wherein, determination of the number of the positioning points is determination of the number of appropriate transverse and longitudinal positioning points.

4. The method according to claim 3, wherein, the positioning points comprise main positioning points and auxiliary positioning points.

5. The method according to claim 3, further comprising compiling number information of the positioning points into a basic information area.

6. The method according to claim 1, wherein, the data capacity of the QR code is larger than the length of the data code.

7. The method according to claim 1, wherein, the total capacity is not less than an encoded data size.

8. The method according to claim 7, wherein, drawing the QR code comprise drawing a QR code framework according to the number of the positioning points, transverse and longitudinal parameters of the positioning points and length and width parameters of the data areas, and filling in the encoded data.

9. The method according to claim 8, wherein, before the result is outputted, all parameter information is processed into codes and filled into a basic information area.

* * * * *